Figure 1:
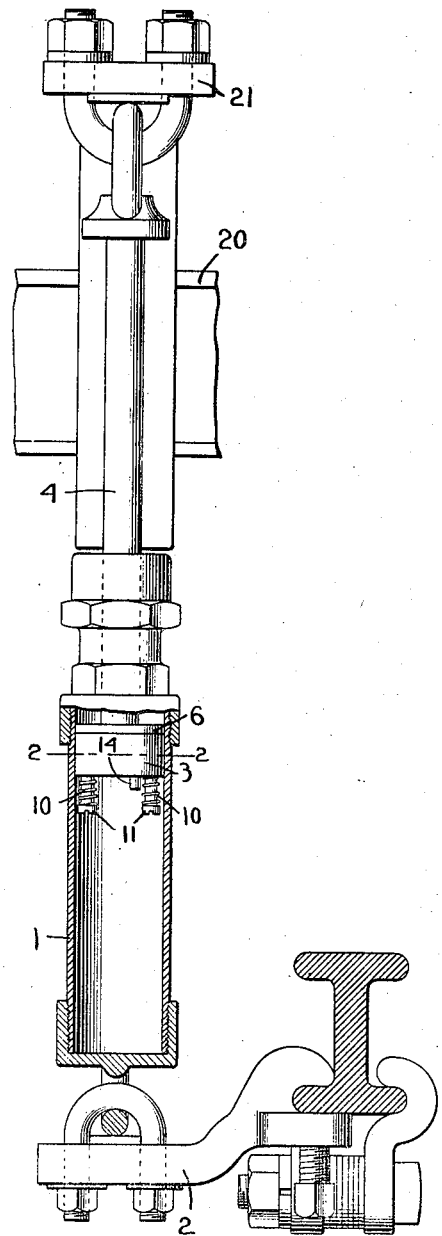

E. FLENTJE.
SHOCK ABSORBER.
APPLICATION FILED JAN. 22, 1917.

1,227,126.

Patented May 22, 1917.

Inventor.
Ernst Flentje
by Heard Smith & Tennant.
Attys

UNITED STATES PATENT OFFICE.

ERNST FLENTJE, OF CAMBRIDGE, MASSACHUSETTS.

SHOCK-ABSORBER.

1,227,126.　　　　　Specification of Letters Patent.　　Patented May 22, 1917.

Application filed January 22, 1917. Serial No. 143,574.

*To all whom it may concern:*

Be it known that I, ERNST FLENTJE, a citizen of the United States, residing at Cambridge, county of Middlesex, State of Massachusetts, have invented an Improvement in Shock-Absorbers, of which the following description, in connection with the accompanying drawing, is a specification, like characters on the drawing representing like parts.

This invention relates to shock absorbers of the type shown in my Patent No. 1,045,136, dated November 26, 1912, and has for its object to provide an improvement by which the valve will always be held true to its position, thus eliminating any noise due to loose play in the valve.

In order to give an understanding of my invention, I have illustrated in the drawings a selected embodiment thereof which will now be described, after which the novel features will be pointed out in the appended claims.

Figure 3:
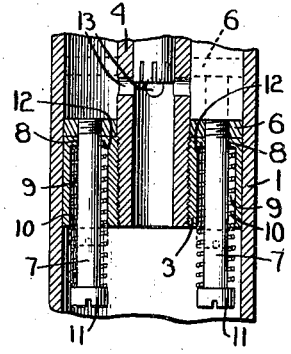
Figure 2:
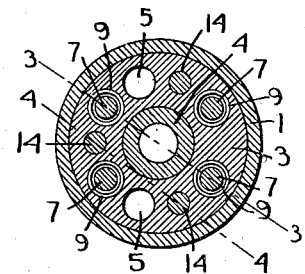
Figure 4:
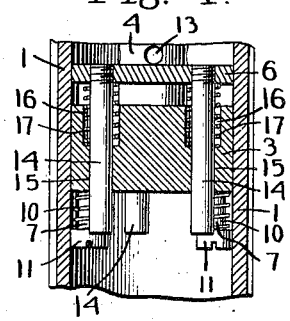

Figure 1 is a vertical sectional view through a shock absorber embodying my invention;

Fig. 2 is a section on the line 2—2, Fig. 1;
Fig. 3 is a section on the line 3—3, Fig. 2;
Fig. 4 is a section on the line 4—4, Fig. 2.

The shock absorber herein illustrated is of that type comprising a cylinder 1 adapted to contain a liquid and which is connected at its lower end to the running gear element of an automobile by a suitable fastening device 2, and a piston or plunger 3 operating in said cylinder and provided with a piston rod 4 which is connected to the body element 20 of the automobile by a suitable connection 21. The piston 3 is provided with a plurality of ports 5 which are controlled by a valve 6 in the form of a ring which surrounds the piston rod 4 and is situated above the piston. This valve has a plurality of headed pins 7 extending therefrom which pass through apertures 8 formed in the piston. Each aperture 8 is enlarged at its lower end and throughout the greater portion of the piston, as shown at 9, in order to make room for a spring 10 which encircles the corresponding pin 7 and is confined between the head 11 thereon and the shoulder 12 in the aperture 8. When the piston moves downwardly in the cylinder, the valve 6 will open to allow the liquid to pass freely through the ports 5 from the lower to the upper side of the piston, and when the piston moves upwardly, the valve 6 will close the ports 5. The piston rod is hollow and is provided with a leak port 13 which is constantly open so that the piston can move upwardly in the cylinder only so fast as the liquid can pass through the port 13.

In devices constructed as above described, the valve 6 is held in position by the pins 7, and as the enlarged portion 9 of the apertures 8 extend nearly to the upper edge of the piston, the portion of the apertures 8 which fit the pins is of relatively-small vertical dimension. As a result, there is apt to be sufficient looseness between the pins 7 and the aperture 8 so as to permit the valve to cant sidewise slightly, thus preventing it from operating correctly.

My improvement relates to an improved means for guiding the valve so as to hold it always true in its proper position and also to means for cushioning the valve so as to eliminate any noise incident to the valve being seated suddenly against the top of the piston. The valve has depending therefrom a plurality of guide pins 14 which extend through apertures 15 formed in the piston. Each aperture is enlarged slightly in diameter at its upper end, as shown at 16, to receive a cushioning spring 17 which encircles the guide pins and acts on the under side of the valve. The guide pins 14 preferably extend clear through the piston, and as the lower end of the apertures 15 are of a size to fit the pins, said pins will invariably hold the valve in its proper position and will prevent any sidewise tipping or canting of the valve.

The springs 17 act to cushion the closing movement of the valve 6 and they are so designed as to prevent a sudden closing of the valve. As a result, when the piston 3 moves upwardly, the valve 6 will close with a gradual movement, thereby giving an easy movement to the piston and obviating any jerky movement which would result if the valve 6 closed suddenly. Further, these springs 17 normally keep the valve 6 opened slightly, as shown in Fig. 4, so that when the automobile is traveling on a relatively-smooth road, the ports 5 will be held open so as to allow the piston 3 to move freely in both directions. This allows the spring of the automobile to have its maximum resiliency when the automobile is traveling on a smooth road. If, however, the spring is suddenly flexed and then recoils, the valve 6 will be closed by the pressure of the oil thereagainst so as to cushion the recoil movement of the spring.

I claim:

1. In a shock absorber, the combination with a cylinder, of a piston therein provided with ports, a valve for closing said ports, valve-retaining pins secured to the valve and extending through the piston, said pins operating to limit the opening movement of the valve, and guiding pins secured to the valve and occupying apertures in the piston, said guiding pins serving to prevent the valve from having any canting movement due to looseness of the valve-retaining pins in their apertures.

2. In a shock absorber, the combination with a cylinder, of a piston therein provided with ports, a valve for closing said ports, valve-retaining pins secured to the valve and extending through the piston, said pins operating to limit the opening movement of the valve, guiding pins secured to the valve and occupying apertures in the piston, said guiding pins serving to prevent the valve from having any canting movement due to looseness of the valve-retaining pins in their apertures, and a cushioning spring encircling each guiding pin and cushioning the movement of the valve toward the piston.

In testimony whereof, I have signed my name to this specification.

ERNST FLENTJE.